(12) United States Patent
Hyun

(10) Patent No.: US 12,127,542 B2
(45) Date of Patent: Oct. 29, 2024

(54) FISHING REEL EQUIPPED WITH LOCK LEVER HAVING FUNCTION TO COVER PROTRUSION OF FRAME

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 29 days.

(21) Appl. No.: 17/954,822

(22) Filed: Sep. 28, 2022

(65) Prior Publication Data
US 2023/0101437 A1    Mar. 30, 2023

(51) Int. Cl.
*A01K 89/02* (2006.01)
*A01K 89/015* (2006.01)

(52) U.S. Cl.
CPC .......... *A01K 89/02* (2013.01); *A01K 89/0192* (2015.05)

(58) Field of Classification Search
CPC .......... A01K 89/0192; A01K 89/01921; A01K 89/0931; A01K 89/01923; A01K 89/01922; A01K 89/01124
USPC ....................................................... 242/223
See application file for complete search history.

(56) References Cited

U.S. PATENT DOCUMENTS

| | | | | |
|---|---|---|---|---|
| 5,839,682 A | * | 11/1998 | Kim | A01K 89/01923 242/314 |
| 5,873,535 A | * | 2/1999 | Jeung | A01K 89/01923 242/313 |
| 6,460,793 B1 | * | 10/2002 | Hirayama | A01K 89/01928 242/321 |
| 10,219,499 B2 | * | 3/2019 | Hyun | A01K 89/01124 |
| 10,342,225 B2 | * | 7/2019 | Umezawa | A01K 89/01921 |
| 10,492,479 B2 | * | 12/2019 | Hyun | A01K 89/01921 |
| 10,617,102 B2 | * | 4/2020 | Hyun | A01K 89/01931 |
| 10,856,536 B2 | * | 12/2020 | Bin Ismail | A01K 89/0192 |
| 2007/0246590 A1 | * | 10/2007 | Hyun | A01K 89/0192 242/310 |
| 2016/0366866 A1 | * | 12/2016 | Sim | A01K 89/01921 |
| 2018/0116194 A1 | * | 5/2018 | Umezawa | A01K 89/01921 |

(Continued)

FOREIGN PATENT DOCUMENTS

| | | | | |
|---|---|---|---|---|
| CN | 107960387 A | * | 4/2018 | ............. A01K 89/00 |
| JP | H10052196 A | | 2/1998 | |

(Continued)

*Primary Examiner* — Michael R Mansen
*Assistant Examiner* — Henrix Soto
(74) *Attorney, Agent, or Firm* — CANTOR COLBURN LLP

(57) ABSTRACT

Provided is a fishing reel equipped with a lock lever having a function to cover a protrusion of a frame. Specifically, by forming a protrusion at a lower portion of a front end of the frame, in particular, by forming a protrusion on which a worm shaft of level wind is installed, the appearance of the frame is maintained sharply to improve grip. In addition, the fishing reel enables convenient use of the lock lever while enhancing design aesthetics by covering the protrusion with the lock lever for detachably attaching a side cover. The fishing reel includes a frame having a spool mount and a palm sidewall, a palm-side cover detachably attached to the palm sidewall, and a lock lever interposed between the palm sidewall and the palm side cover and configured to lock or unlock the palm side cover.

4 Claims, 16 Drawing Sheets

(56) References Cited

U.S. PATENT DOCUMENTS

| | | | |
|---|---|---|---|
| 2019/0014764 A1* | 1/2019 | Kim | A01K 89/01921 |
| 2019/0269116 A1* | 9/2019 | Hyun | A01K 89/01921 |
| 2020/0253179 A1* | 8/2020 | Kim | A01K 89/01928 |

FOREIGN PATENT DOCUMENTS

| | | | |
|---|---|---|---|
| JP | 2018068233 A | 5/2018 | |
| JP | 2018110580 A | 7/2018 | |
| JP | 2019033744 A | 3/2019 | |
| JP | 2019150019 A | 9/2019 | |
| KR | 20070121512 | 12/2007 | |
| KR | 20120033241 | 4/2012 | |
| KR | 102127297 | 6/2020 | |

\* cited by examiner

LOCK LEVER OPENED STATE

LOCK LEVER LOCKED STATE

FISHING REEL EQUIPPED WITH LOCK LEVER HAVING FUNCTION TO COVER PROTRUSION OF FRAME

BACKGROUND OF THE INVENTION

Field of the Invention

The present disclosure relates to a fishing reel equipped with a lock lever having a function to cover a protrusion of a frame. Specifically, by forming a protrusion at a lower portion of a front end of the frame, in particular, by forming a protrusion on which a worm shaft of a level wind is installed, an appearance of the frame is maintained sharply to improve a grip feeling. In addition, the fishing reel of the present disclosure enhances design aesthetics of the fishing reel and enables convenient use of the lock lever by covering the protrusion with the lock lever for detachably attaching a palm side cover.

Description of the Related Art

As can be seen in Korean Patent No. 10-2127297, Korean Patent Application Publication No. 10-2012-0033241, Korean Patent Application Publication No. 10-2007-0121512, etc., in a fishing reel, particularly in a bait casting reel, a level wind is provided in front of a spool to guide a fishing line, when released from or wound on a spool, by reciprocating left and right.

The level wind of such a fishing reel is slidably coupled to a guide rod provided by extending transversely on a frame and is connected to a worm shaft provided under the guide rod so that the reciprocating movement of the level wind is made in response to a rotation of the spool.

Therefore, in order to mount the guide rod and the worm shaft of the level wind, both sidewall of the frame have a front-end protruding forward. The fishing reel in the shape of an oval or a droplet has a high design aesthetic, as well as a fine grip when a user grips the fishing reel during fishing.

On the other hand, both side covers of the fishing reel are detachably coupled to the frame for repair or maintenance of parts of the fishing reel, replacement of the spool, etc.

In this case, since a palm side cover, which is attached to and detached from a palm side wall where the spool mount is formed, is more frequently opened and closed than a handle side cover, the handle side cover is coupled with bolts, while various types of locking means are added to the palm side cover to facilitate the detachment.

In addition, as a typical locking means for opening and closing the palm side cover, a lock lever is provided and configured to be coupled so as to rotate vertically with respect to the frame.

Such lock lever has an operation unit exposed to the outside of the fishing reel, and by pushing or pulling the operation unit to rotate the lock lever, the palm side cover is locked or unlocked to/from the frame.

Accordingly, since the conventional fishing reel has a structure in which the operation unit of the lock lever is always protruded and exposed regardless of the change in the locking state of the palm side cover, the interference of the lock lever occurs when gripping the fishing reel, making the fishing reel inconvenient and unsafe to grip. In addition to not being able to be gripped safely, there is a big problem in that the lock lever rotates unintentionally during fishing, which leads to separation of the palm side cover and consequent damage or loss of parts.

SUMMARY OF THE INVENTION

To achieve objectives above, the fishing reel of the present disclosure includes a frame having a spool mount and a palm sidewall provided with a first protrusion extending forward and a second protrusion connected to a lower portion of the first protrusion, a palm-side cover detachably attached to an outer surface of the palm sidewall and provided with a first cover that covers the first protrusion, and a lock lever interposed between the palm sidewall and the palm side cover and configured to lock or unlock the palm side cover, the lock lever having an operation unit that is exposed to an outside of the palm side cover and is provided with a second cover configured to cover the second protrusion.

In addition, in the fishing reel of the present disclosure, the lock lever includes a body coupled to the spool mount so as to be rotated in a circumferential direction of the spool mount, with the operation unit provided at a front side of the body, and a binding protrusion configured to be bound to or released from the palm sidewall when the body is rotated up and down in opposite directions.

Furthermore, in the fishing reel of the present disclosure, the palm sidewall includes a locking protrusion that protrudes from an outer surface between the spool mount and the first protrusion, the palm side cover is coupled to the spool mount so as to be rotated in a circumferential direction of the spool mount at the palm sidewall, and includes a binding protrusion that is bound to or released from the palm sidewall when the palm side cover is rotated up and down in opposite directions, and the lock lever is shafted to an inner surface of the palm side cover so as to be rotated up and down, and includes a shaft part connected at a front portion thereof to the operation unit, and a locking part configured to be caught on the locking protrusion when the lock lever is rotated upward and to be released from the locking protrusion when the lock lever is rotated downward.

Moreover, in the fishing reel of the present disclosure, the frame includes a locking pin that penetrates the palm sidewall and is arranged to protrude outside the palm sidewall and to be retracted into the palm sidewall, the palm side cover is coupled to the spool mount so as to be rotated in a circumferential direction of the spool mount at the palm sidewall, and comprises a binding protrusion that is bound to or released from the palm sidewall when the palm side cover is rotated up and down in opposite directions; and a locking hole into which the drawn-out locking pin is fitted, and the lock lever is shafted to an inner surface of the palm side cover so as to be rotated up and down, and includes a shaft part connected at a front portion thereof to the operation unit, and a locking part configured to be caught on the locking protrusion when the lock lever is rotated upward and to be released from the locking protrusion when the lock lever is rotated downward.

According to the fishing reel of the present disclosure, the operation unit of the lock lever is arranged on the protrusion of the frame to mount the level wind and improves the aesthetics of design, with adopting the oval or droplet-shaped frame structure at the frame, so that the operation unit of the lock lever does not protrude out of the frame, thereby enabling comfortable fishing without incompatibility when gripping the fishing reel, and dualizes production to a non-rotational detachment method of the palm side cover using a rotary lock lever or a rotary detachment method of the palm side cover using revolving lock lever, thereby enabling product selection according to the user's needs, and maintains locking state of the lock lever or the palm side cover more firmly by using the locking protrusion or the locking pin to prevent the lock lever from being unintentionally released during use, thereby reducing damage or loss of parts.

BRIEF DESCRIPTION OF THE DRAWINGS

The above and other objectives, features, and other advantages of the present disclosure will be more clearly understood from the following detailed description taken in conjunction with the accompanying drawings, in which.

DETAILED DESCRIPTION OF THE INVENTION

Figure 1A:
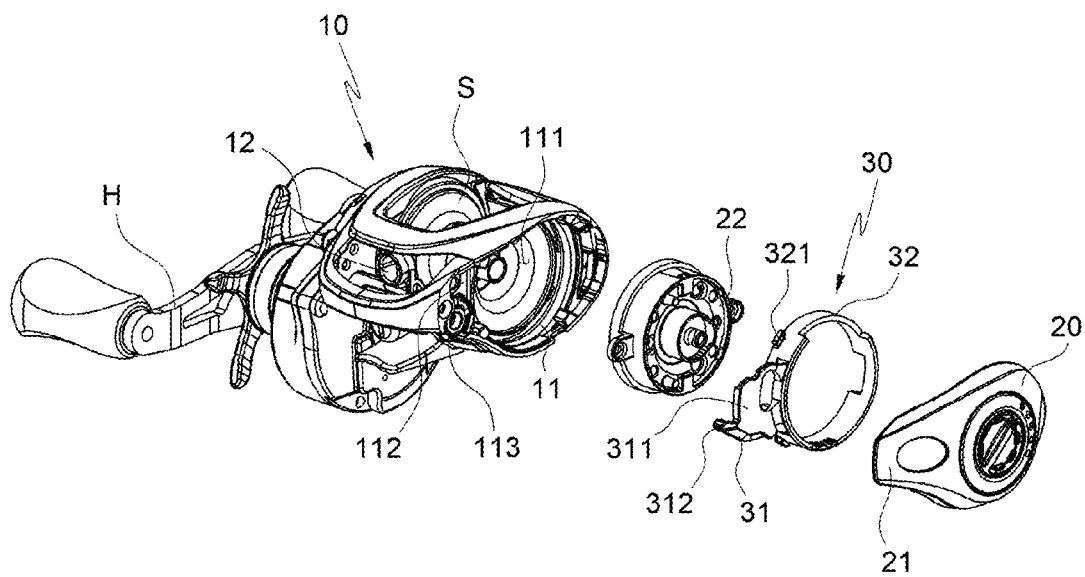
FIGS. 1A and 1B are exploded perspective views illustrating a first embodiment of the present disclosure.

The present disclosure may be diversely modified and may be embodied in various forms, so various aspects or embodiments of the present disclosure will be described in detail hereinbelow. While specific embodiments of the disclosure will be described hereinbelow, they are only illustrative purposes and should not be construed as limiting to the present disclosure. Accordingly, the present disclosure should be construed to cover not only the specific embodiments but also cover all modifications, equivalents, and substitutions that fall within the technical idea and scope of the present disclosure.

In the drawings, like reference numerals, particularly, reference numerals having the same last two digits, or the same last two digits and letters refer to like elements having like functions, and unless the context clearly indicates otherwise, elements referred to by reference numerals in the drawings should be understood on the basis of this standard.

Also, for convenience of understanding of the elements, in the figures, sizes, or thicknesses may be exaggerated to be large (or thick), may be expressed to be small (or thin) or may be simplified for clarity of illustration, but due to this, the protective scope of the present disclosure should not be interpreted narrowly.

The terminology used herein is for the purpose of describing particular aspects (or embodiments) only and is not intended to be limiting of the present disclosure. As used herein, the singular forms are intended to include the plural forms as well, unless the context clearly indicates otherwise.

It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by those who are ordinarily skilled in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Terms such as "a first~" and "a second~" are used only for the purpose for distinguishing a constitutive element from other constitutive element, but constitutive element should not be limited to a manufacturing order, and the terms described in the detailed description of the disclosure may not be consistent with those described in the claims.

Figure 1B:
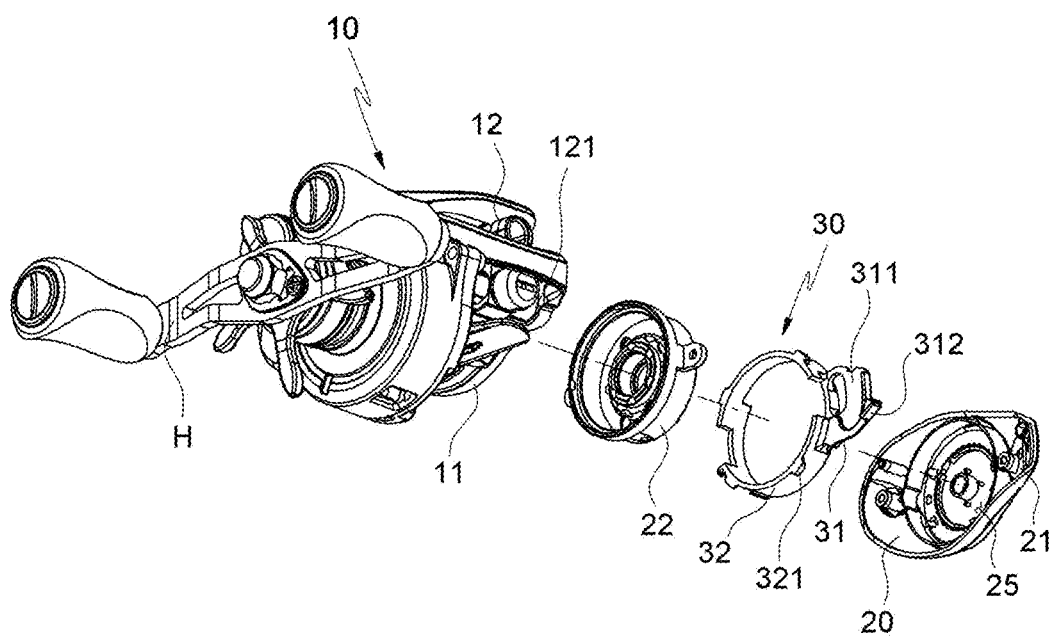
Figure 2A:
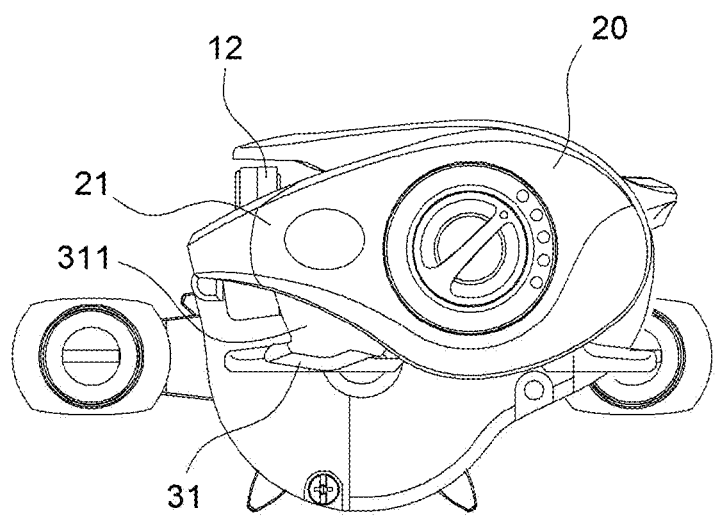
FIGS. 2A and 2B are side views illustrating the first embodiment of the present disclosure.
Figure 2B:
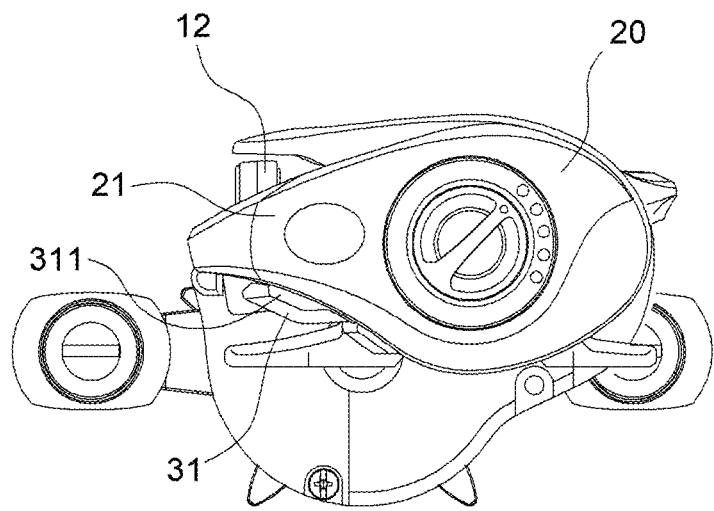
Figure 3A:
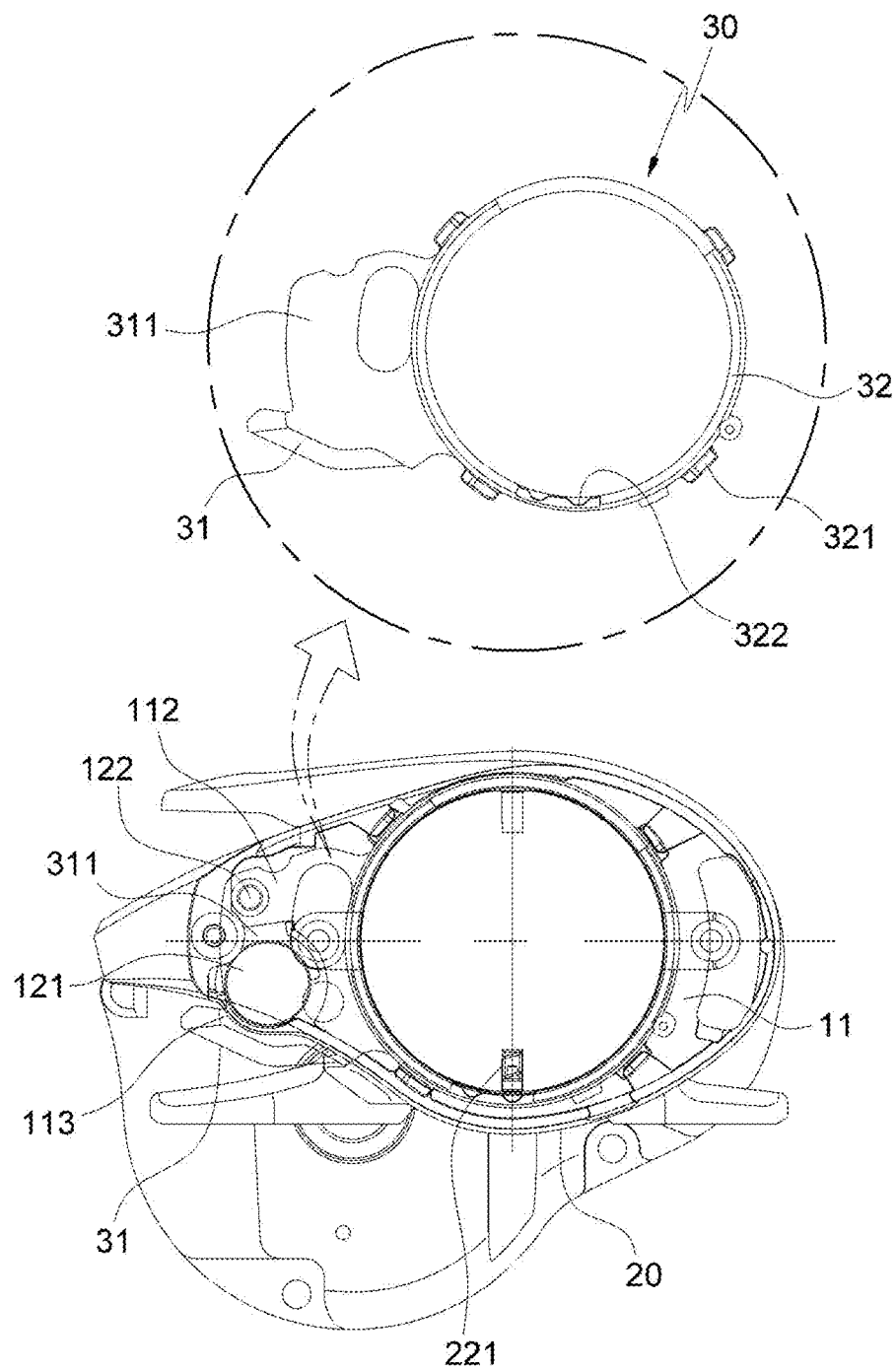
FIGS. 3A and 3B are side perspective views illustrating a second embodiment of the present disclosure.
Figure 3B:
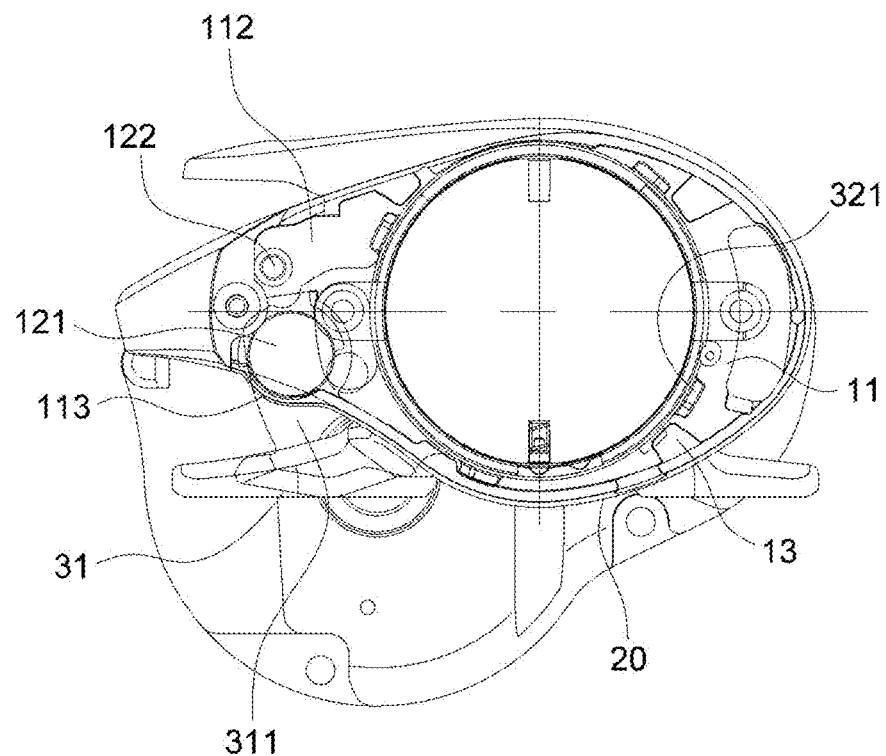

For convenience of the description of a fishing reel according to the present disclosure, when an approximate direction rather than a precise direction is specified with reference to FIG. 1B, a lower side is determined based on a direction to which gravity is applied, and up and down directions and right and left directions are determined based on the lower side. This standard may be also applied to the other drawings, and directions may be specified and described based on this standard unless the detailed description of the disclosure and the claims specially indicate otherwise.

Hereinbelow, a fishing reel according to the present disclosure will be described with reference to the accompanying drawings.

The present disclosure relates to a fishing reel equipped with a lock lever having a function to cover a protrusion of a frame. Referring to FIGS. 1A to 5E, the fishing reel includes: a frame 10 having a palm sidewall 11 provided with a spool mount 111, a first protrusion 112 extending forward, and a second protrusion 113 connected to a lower portion of the first protrusion 112, a palm side cover 20 detachably attached to an outer surface of the palm sidewall 11 and provided with a first cover 21 that covers the first protrusion 112, and a lock lever 30 interposed between the palm sidewall 11 and the palm-side cover 20 and configured to lock and unlock the palm-side cover 20, the lock lever 30 having an operation unit that is exposed to an outside of the palm-side cover 20 and is provided with a second cover 311 configured to cover the second protrusion 113.

FIGS. 1A to 3B illustrate a first embodiment of the present disclosure, FIGS. 4A to 4D illustrate a second embodiment of the present disclosure, and FIGS. 5A to 5E illustrate a third embodiment of the present disclosure.

The first embodiment differs from the second and third embodiments in the point that the palm-side cover is differently constructed. Specifically, the palm-side cover 20 in the first embodiment is non-rotatably attached whereas the palm-side cover 20 in the second and third embodiments is rotatably attached. On the other hand, the second embodiment is distinguished from the first and third embodiments in the point that that the frame 10 has a locking protrusion 114. The third embodiment is distinguished from the first and second embodiments in the point that that the frame 10 has a locking pin 14.

Some shared features of the first, second, and third embodiments are described below.

First, the palm sidewall 11 in a spool mounting part of the frame 10 is provided with a spool mount 111 opened to mount a spool S. In a handle sidewall (not denoted by a reference numeral in the drawing) of the spool mounting part, a gear unit configured to operate the spool S and a handle H is embedded at a handle side cover (not denoted by a reference numeral). Thereby, the handle H to rotate the spool is connected to the spool S.

At here, the first and second protrusions 112 and 113 are protrude from the palm side wall 11 and the handle side wall so that a side structure of the frame 10 is sharp in order to improve design aesthetics. A guide rod 122 of a level wind 12 is coupled to the first protrusion 112, placed on the upper portion of the frame 10, and a worm shaft 121 for reciprocating of the level wind 12 is installed at the second protrusion 113, placed on the lower portion of the frame 10.

The level wind 12 is provided with a fishing line guide hole, and the guide rod 122 penetrates the level wind 12, and is coupled to guide the left and right movement of the level wind 12, The worm shaft 121 has a double helical groove formed on an outer circumferential surface. As the worm shaft 121 rotates in an interlocked state with the spool S and the gear unit, the level wind 12 reciprocates left and right along the double spiral groove of the worm shaft 12, thereby the position of the fishing line when released or wound from the spool (S) is changed.

In addition, unlike the handle side cover, which is bolted together due to the relatively low opening and closing frequency, the palm side cover 20 is frequently opened and closed for reasons such as replacement of the spool (S) or maintenance of parts, etc., A plurality of jamming projections 13 is provided on the outer surface of the palm sidewall portion 11 along a circumference of the spool mount 111. Through a structure in which a first binding protrusion 321 of the lock lever 30 or a second binding protrusion 23 of the palm side cover 20 is caught by a jamming protrusion 13, the palm side cover 20 is locked or unlocked and opened or closed.

At here, the palm side cover 20 is fitted to the spool mount 111, and a separate spool cover 22 on which the shaft of the spool S is installed is further coupled to an inner surface of the palm side cover 20.

Furthermore, the first cover 21 protrudes in a streamlined structure that does not interfere with the curved structure of the palm side cover 20 to correspond to the shape of the first protruding 112. When the palm side cover 20 is attached to the palm sidewall 11, the palm side cover 20 completely covers and protects the palm sidewall 11 and the first protrusion 112.

Moreover, the operating unit 31 of the lock lever 30 has a shape corresponding to a lower edge of the second protrusion 113, and the second cover 311 having a larger area and shape than the second protrusion 113 is connected to an upper portion of the operation unit 31.

Thereby, in a state in which the palm side cover 20 is mounted on the palm sidewall 11, as the operation unit 31 and the second cover 311 are exposed to the outside of the palm side cover 20, the lock lever 30 covers the second protrusion 113, and regardless of the locked or unlocked state of the palm side cover 20, that is, regardless of the operating direction of the lock lever 30, the second cover 311 always covers the second protrusion 113.

Hereinbelow, the first embodiment of the present disclosure will be described with reference to FIGS. 1A to 3B.

The lock lever 30 includes a body 32 coupled to the spool mount 111 so as to be rotated in a circumferential direction of the spool mount 111, with the operation unit 31 provided at a front side of body 32, and the first binding protrusion configured to be bound to or released from the palm sidewall when the body 32 is rotated up and down in opposite directions.

The body 32 and the operation unit 31 have an integrated structure, and in the drawings of the present specification, the ring-shaped body 32 is extrapolated to the spool cover 22 and the spool cover 22 is the axis of the lock lever. Although the first embodiment in which the lock lever 30 with the spool cover 22 as an axis rotates up and down is representatively illustrated, the coupling structure for rotation of the lock lever 30 may be variously modified (for example, it is also possible that the body 32 of the lock lever 30 is directly installed on the inner surface of the palm side cover 20).

The operation unit 31 is configured such that the second cover 311 is connected to the upper portion of the operation unit 31 to always cover the second protrusion 113 in response to the rotational direction of the lock lever 30. A hook 312 protrudes from an outer end of the operation unit 31 so that the user can more easily push or pull the operation unit 31 with a finger.

Therefore, after coupling the palm side cover 20 to the palm sidewall 11 and pushing the operation unit 31 to rotate the lock lever 30 upward, the first binding protrusion 321 is caught by the jamming protrusion 13 to lock the palm side cover 20. Thereby, the palm side cover 20 is mounted on the frame 10, and Conversely, when the lock lever 30 is rotated downward by pulling the operation unit 31, the first binding protrusion 321 is separated from the jamming protrusion 13. Thereby, the palm side cover 20 can be separated from the frame 10.

Figure 4A:
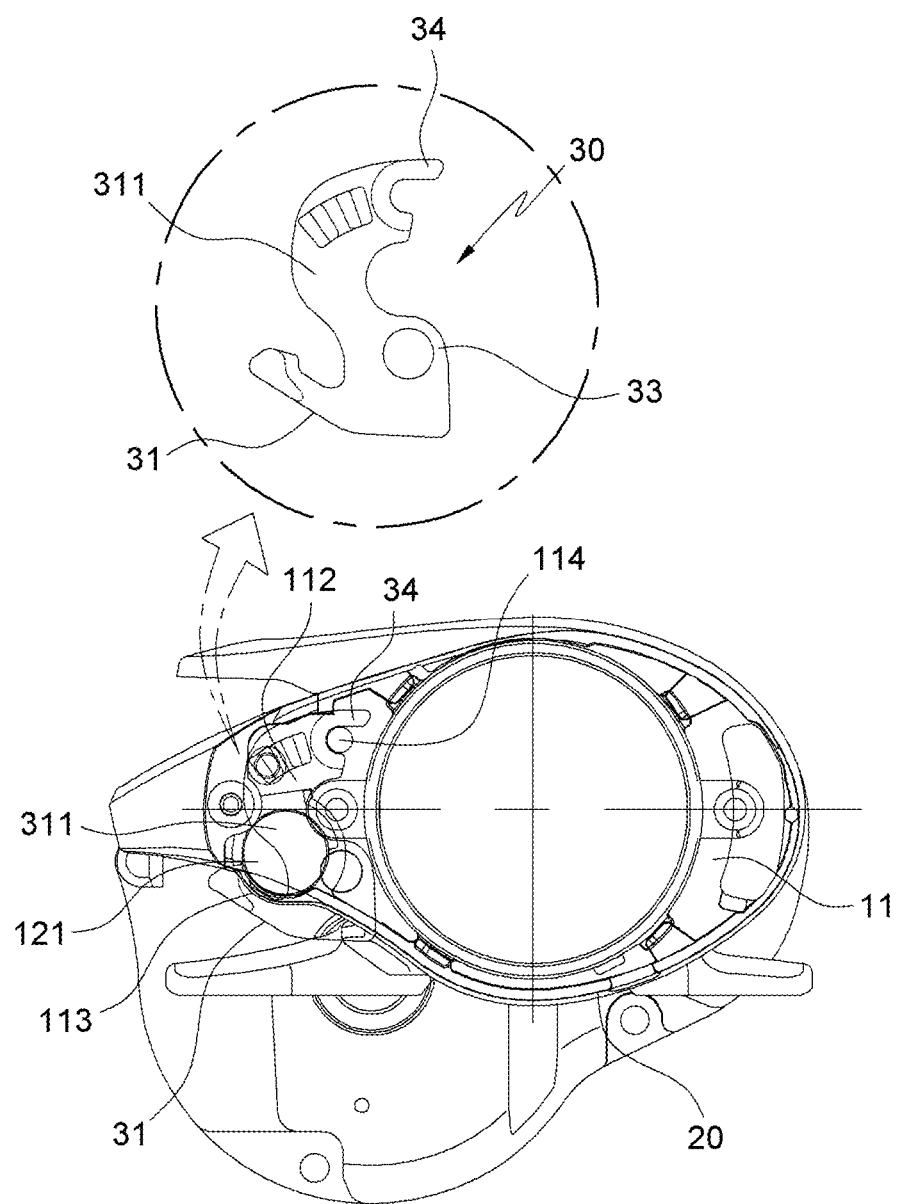
FIGS. 4A, 4B, 4C, and 4D are side perspective views illustrating the second embodiment of the present disclosure.
Figure 4B:
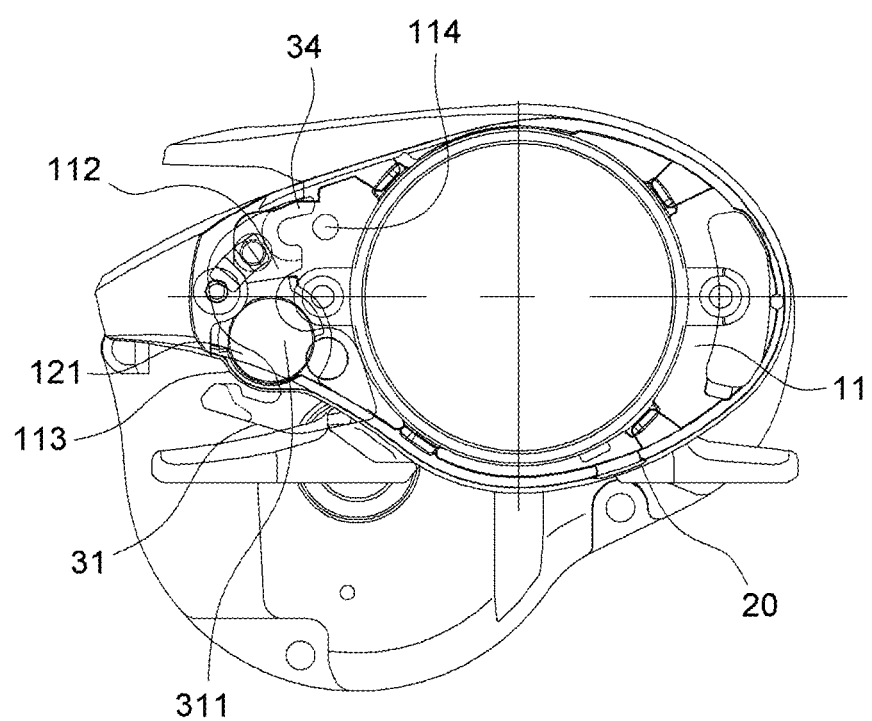
Figure 4C:
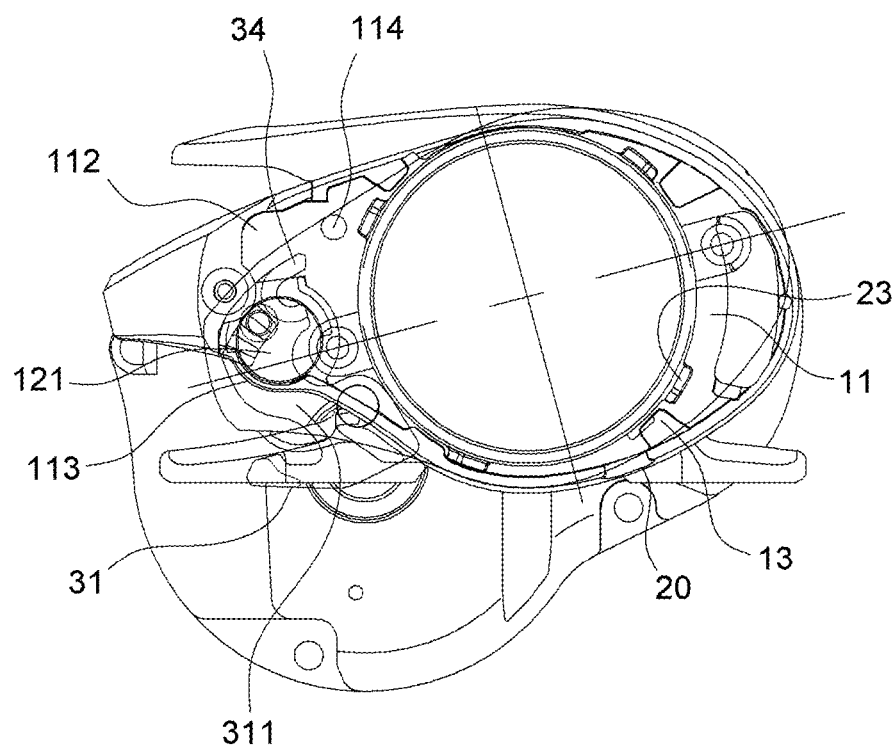
Figure 4D:
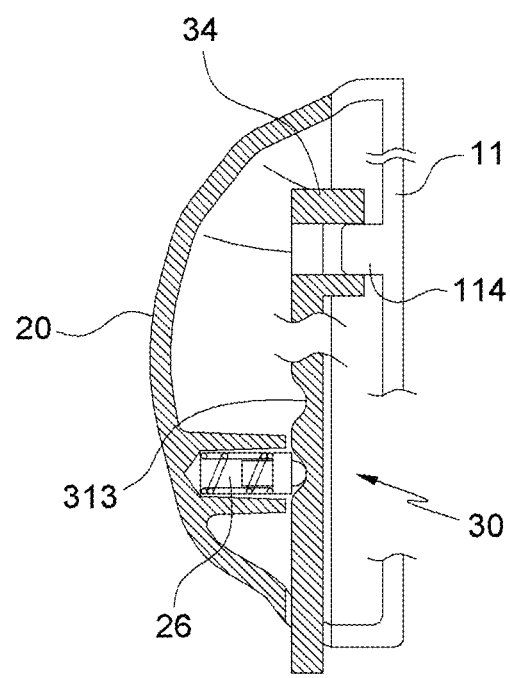
Figure 5A:
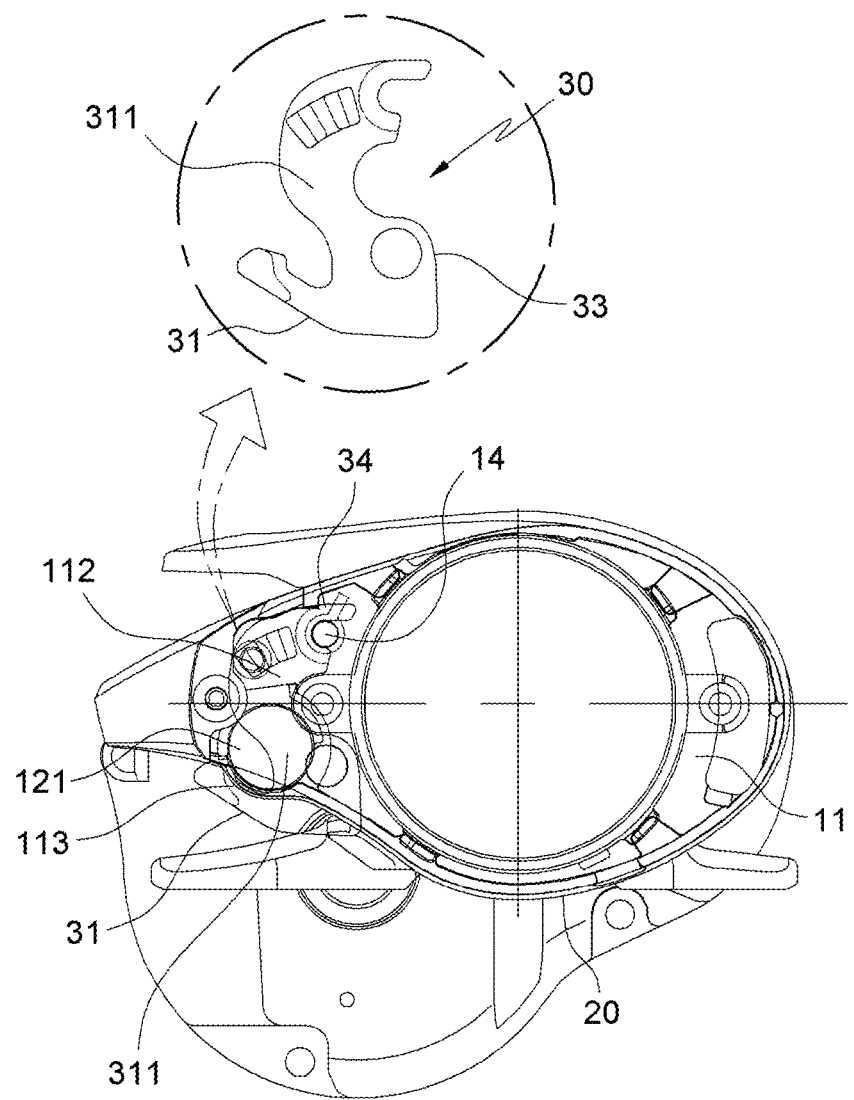
FIGS. 5A, 5B, 5C, 5D, and 5E are side perspective views illustrating a third embodiment of the present disclosure.
Figure 5B:
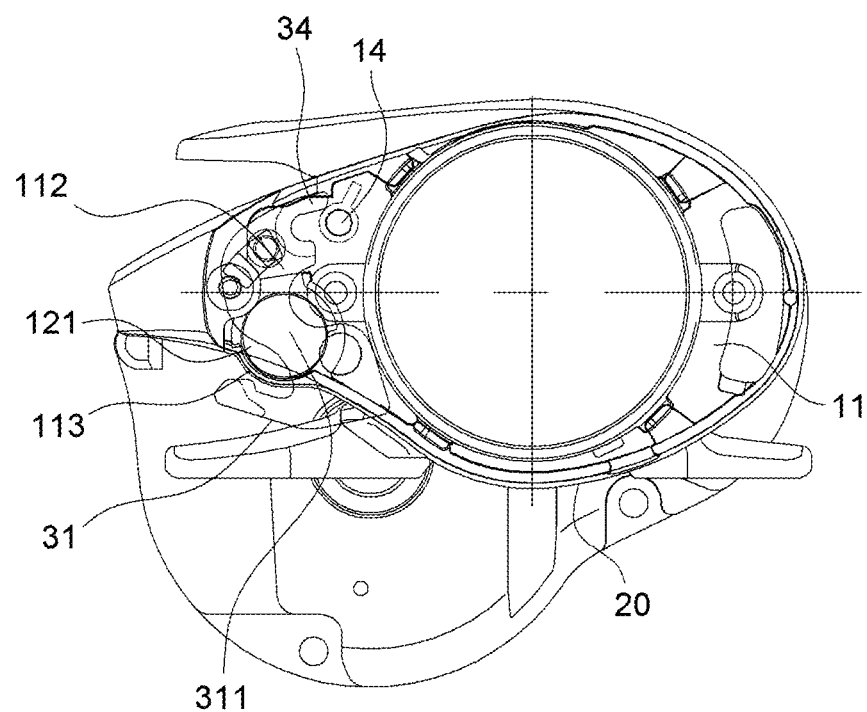
Figure 5C:
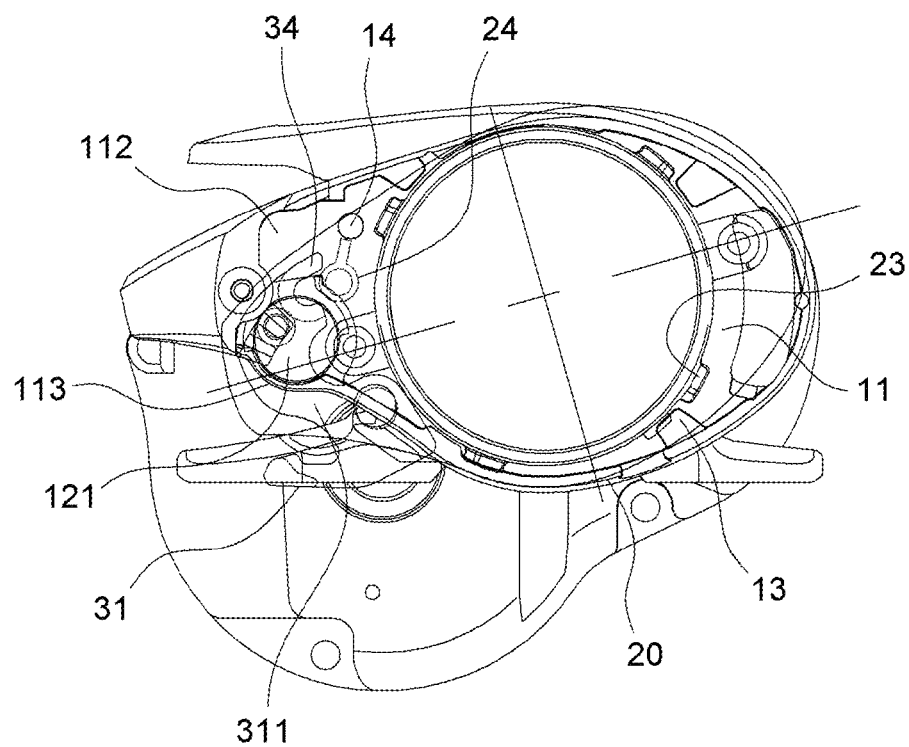
Figure 5D:
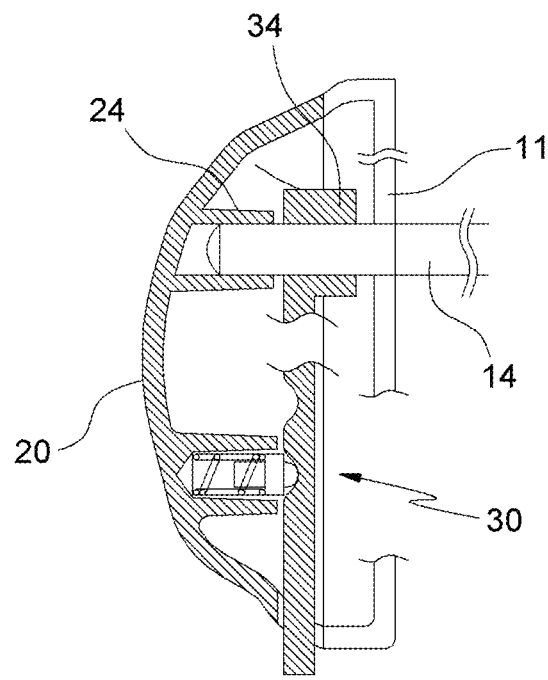
Figure 5E:
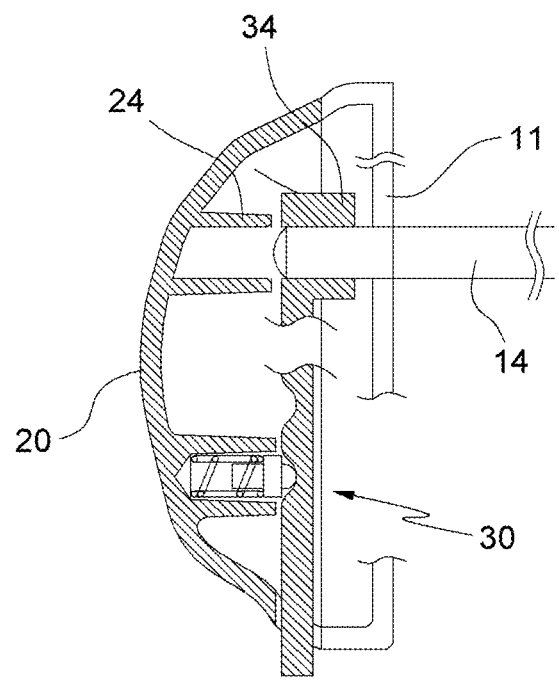

Hereinbelow, the second embodiment of the present disclosure will be described with reference to FIGS. 4A to 4B.

The palm sidewall 11 includes a locking protrusion 114 that protrudes from an outer surface between the spool mount 111 and the first protrusion 112.

The palm side cover 20 is coupled to the spool mount 111 so as to be rotated in the circumferential direction of the spool mount 111 at the palm sidewall 20, and includes the second binding protrusion 23 that is bound to or released from the palm sidewall 11 when the palm side cover 20 is rotated up and down in opposite directions.

The lock lever 30 is shafted to the inner surface of the palm side cover 20 so as to be rotated up and down, and includes a shaft part 33 connected at a front portion thereof to the operation unit 31, and a locking part 34 configured to be caught on the locking protrusion 114 when the lock lever 30 is rotated upward and to be released from the locking protrusion 114 when the lock lever 30 is rotated downward.

The locking protrusion 114 protrudes from a rear side of the guide rod 122 to outside of the guide rod by a predetermined height.

Like the first binding protrusion 321, the second binding protrusion 23 is caught on or released from the jamming protrusion 13 by position movement according to rotation, and unlike the first embodiment, the second binding protrusion 23 is provided on the palm side cover 20 instead of the lock lever 30.

In addition, the lock lever 30 of the second embodiment is in a form in which the body portion 32 of the first embodiment is omitted. The shaft part 33 is provided at a rear end of the operation unit 31 and is hinged to the inner surface of the palm side cover 20, and the lock lever 30 rotates up and down about the shaft part 33 as an axis.

Like the first embodiment, the lock lever 30 of the second embodiment also has the second cover 311 extended and connected to the upper portion of the operation unit 31. However, the lock lever 30 of the second embodiment different from the first embodiment in that the locking part 34 is connected to the upper end of the second cover 311 in a 'C' shape with an open rear surface.

Accordingly, when the palm side cover 20 is in contact with the palm sidewall 11 and the front end is rotated upward, the palm side cover 20 is primarily locked while the second binding protrusion 23 being caught by the jamming protrusion 13. Thereafter, when the lock lever 30 is rotated upward by pushing the operation unit 31 upward, the locking part 34 is caught by the locking protrusion 114 and coupled thereto. Thereby, the locking of the palm side cover 20 is completed and the palm side cover 20 is mounted on the frame 10, Conversely, when the lock lever 30 is rotated downwardly by pulling the operation unit 31, the locking part 34 is removed from the locking protrusion 114 and the primary lock is released. Then, when the palm side cover 20 is gripped and the front end is rotated downward, the second binding protrusion 23 is separated from the jamming protrusion 13. Thereby, the palm side cover 20 can be separated from the frame 10.

Hereinbelow, the third embodiment of the present disclosure will be described with reference to FIGS. 5A to 5E.

The frame includes the locking pin 14 that penetrates the palm sidewall 11 and is arranged to protrude outside the palm sidewall 11 and to be retracted into the palm sidewall 11.

The palm side cover 20 is coupled to the spool mount 111 so as to be rotated in the circumferential direction of the spool mount 111 at the palm sidewall 11, and includes the second binding protrusion 23 that is bound to or released from the palm sidewall 11 when the palm side cover 20 is rotated up and down in opposite directions, and a locking hole 24 into which the drawn-out locking pin 14 is fitted.

The lock lever 30 is shafted to the inner surface of the palm side cover 20 so as to be rotated up and down, and includes the shaft part 33 connected at the front portion thereof to the operation unit 31, and the locking part 34 configured to be caught on the locking pin 14 when the lock lever 30 is rotated upward and to be released from the locking pin 14 when the lock lever 30 is rotated downward.

The third embodiment of the present disclosure is different from the second embodiment in that the locking pin 14 are provided through both sidewalls of the frame 10 in place of the locking protrusions 114 of the second embodiment.

One end of the locking pin 14 is supported by a spring (not shown in the drawings) so as to protrude out of the outer surface of the palm sidewall 11. The other end is exposed to the handle sidewall so that the user can pull the locking pin 14 toward the handle.

The locking hole 24 protrudes from the inner surface of the palm side cover 20 so that one end of the locking pin 14 is insertable.

A description of the same configuration as that of the second embodiment will be omitted.

In the third embodiment, in a state in which the locking pin 14 is pulled into the inside of the palm sidewall 11, when the palm side cover 20 is in contact with the palm sidewall 11 and the front end is rotated upward, the palm side cover 20 is primarily locked while the second binding protrusion 23 being caught by the jamming protrusion 13. When the hand is released from the locking pin 14, the locking pin 14 is drawn out of the palm sidewall 11 by the spring and is inserted into the locking hole 24 to achieve secondary locking. Thereafter, when the lock lever 30 is pushed as in the second embodiment, the locking part 34 is caught and coupled to the locking pin 14. Thereby, the locking of the palm side cover 20 is completed and the palm side cover 20 is mounted on the frame 10.

Conversely, in a state in which the locking part 34 is removed from the locking pin 14 by pulling the lock lever 30, when the front end of the palm side cover 20 is rotated downward after pulling the locking pin 14 to the other side, the second binding protrusion 23 is separated from the jamming protrusion 13 and the palm side cover 20 can be separated.

In the present disclosure having such a configuration, the palm side cover 20 can be more firmly locked and mounted using the lock lever 30. Moreover, the protruding position of the operating unit 31 accompanying the retractable lock lever 30 is arranged to match the protruding structure of the frame 10 so that the oval or water droplet-shaped frame 10 is maintained as it is. While adopting such structure, the operation unit 31 of the lock lever 30 does not protrude to the outside of the frame 10, enabling convenient fishing without discomfort when the fishing reel is gripped during fishing.

Reference numeral 25 denotes a withdrawal groove 25 through which the second cover 311 of the lock lever 30 protrudes out of the palm side cover 20.

In addition, reference numerals 322 and 313 denote locking grooves 322 and 313 formed on an inner peripheral surface of the body 32 and the outer surface of the second cover 311, respectively. The locking pins 221 and 26 provided on the spool cover 22 and the palm side cover 20 generate a clicking sound while being caught in the locking grooves 322 and 313, and enable user to more intuitively and reliably recognize the locking or unlocking state of the lock lever 30.

At this time, due to a retractable lock lever 30, a fine gap inevitably occurs between the withdrawal groove 25 and the second cover 311, which inevitably causes damage (corrosion, etc.) to internal parts due to an intrusion of seawater during fishing.

Figure 6:
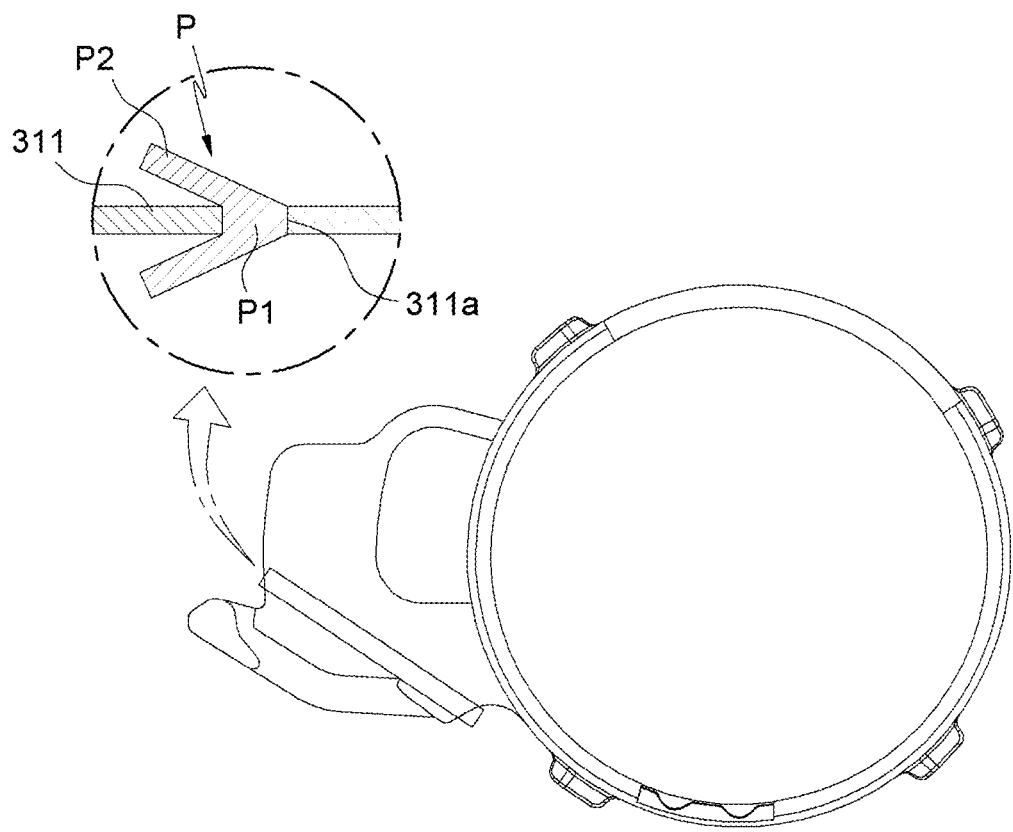
FIG. 6 shows a side view and a main part cross-sectional view illustrating a packing member according to the present disclosure.

Therefore, the present disclosure further includes a packing member (P) provided in the second cover 311 as shown in FIG. 6.

The packing member P is provided at a position corresponding to the withdrawal groove 25 in the second cover 311 when the lock lever 30 is locked. The packing member P includes an airtight part P2 protruding from both sides of the second shielding portion 311 to fill the gap of the withdrawal groove 25. Each of the airtight part P2 is inclined upward so that an end thereof is extended from both surfaces of the second cover 311 in the unlocking direction of the lock lever 30 (For reference, in the cross-sectional view of FIG. 6, the length and thickness of the airtight part P2 are exaggerated for convenience of understanding).

Specifically, the packing member (P) is a soft material having an elastic force such as rubber or silicone, and in the embedding portion P1 having the same thickness as the second cover 311, the pair of airtight part P2 is connected downward in an inverted 'V' shape.

In addition, the second cover 311 is provided with a fitting groove 311a penetrating the second cover 311, and the embedding portion P1 of the packing member P is installed by being press-fitted into the fitting groove 311a.

Therefore, when the lock lever 30 is locked, the airtight parts P2, which are opened in a 'V' shape, are closed while being inserted into the withdrawal groove 25 to seal the gap of the withdrawal groove 25 to secure watertightness, and when the lock lever 30 is released, the airtight parts P2 are returned to their original state in a 'V' shape. Thereby, it is possible to prevent the intrusion of seawater or the like into the palm side cover 20 by ensuring watertightness while the packing member P does not impede the retracting operation of the lock lever 30.

In the above description of the present disclosure, with reference to the accompanying drawings, the fishing reel has been mainly described, but the present disclosure is capable of various modifications, changes and substitutions by those skilled in the art. Such modifications, changes and substitutions should be construed as falling within the protection scope of the present disclosure.

What is claimed is:

1. A fishing reel comprising:
    a frame having a palm sidewall provided with a spool mount, the spool mount being opened to mount a spool, a first protrusion protruding and extending forward from a front end of the palm sidewall, a guide rod of a level wind being coupled to the first protrusion, and a second protrusion connected to a lower portion of the first protrusion, a worm shaft of the level wind being coupled to the second protrusion,
    a palm-side cover detachably attached to an outer surface of the palm sidewall and provided with a first cover protruding forward to correspond to a shape of the first protrusion so as to cover the first protrusion,
    a lock lever interposed between the palm sidewall and the palm-side cover and configured to lock and unlock the palm-side cover, the lock lever having an operation unit that protrudes forward to correspond to a shape of a lower edge of the second protrusion, thereby being exposed to an outside of the palm side cover, and
    a second cover configured to be connected to an upper portion of the operation unit to cover the second protrusion, the second cover being larger than the second protrusion and having an area larger than that of the second protrusion,
    wherein, when the palm-side cover is attached to the palm sidewall, the first cover completely covers the first protrusion, and
    the second cover covers the second protrusion both at a locked state of the palm side cover and at an unlocked state of the palm side cover.

2. The fishing reel of claim 1, wherein the lock lever further comprises:
    a body coupled to the spool mount so as to be rotated in a circumferential direction of the spool mount, with the operation unit provided at a front side of the body; and
    a binding protrusion configured to be bound to or released from the palm sidewall when the body is rotated up and down in opposite directions.

3. The fishing reel of claim 1, wherein the palm sidewall includes a locking protrusion that protrudes from an outer surface between the spool mount and the first protrusion,
    the palm side cover is coupled to the spool mount so as to be rotated in a circumferential direction of the spool mount at the palm sidewall, and comprises a binding protrusion that is bound to or released from the palm sidewall when the palm side cover is rotated up and down in opposite directions, and
    the lock lever is shafted to an inner surface of the palm side cover so as to be rotated up and down, and comprises: a shaft part connected at a front portion thereof to the operation unit; and a locking part configured to be caught on the locking protrusion when the lock lever is rotated upward and to be released from the locking protrusion when the lock lever is rotated downward.

4. The fishing reel of claim 1, wherein the frame includes a locking pin that penetrates the palm sidewall and is arranged to protrude outside the palm sidewall and to be retracted into the palm sidewall,
    the palm side cover is coupled to the spool mount so as to be rotated in a circumferential direction of the spool mount at the palm sidewall, and comprises a binding protrusion that is bound to or released from the palm sidewall when the palm side cover is rotated up and down in opposite directions; and a locking hole into which the drawn-out locking pin is fitted, and
    the lock lever is shafted to an inner surface of the palm side cover so as to be rotated up and down, and comprises: a shaft part connected at a front portion thereof to the operation unit; and a locking part configured to be caught on the locking pin when the lock lever is rotated upward and to be released from the locking pin when the lock lever is rotated downward.

* * * * *